Patented Apr. 3, 1923.

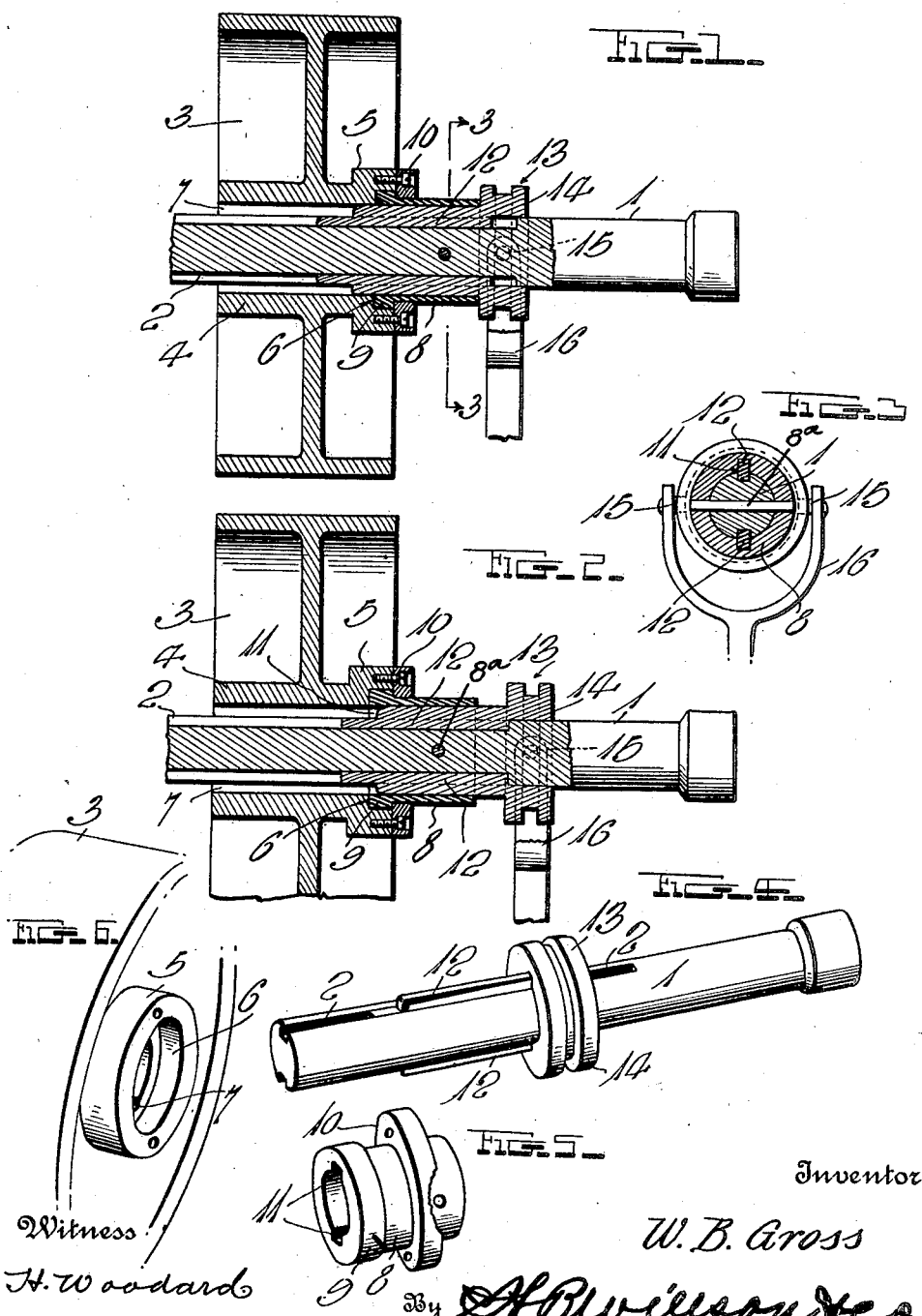

1,450,804

UNITED STATES PATENT OFFICE.

WILLIAM B. GROSS, OF OXNARD, CALIFORNIA.

CLUTCH.

Application filed April 28, 1921. Serial No. 465,115.

*To all whom it may concern:*

Be it known that I, WILLIAM B. GROSS, a citizen of the United States, residing at Oxnard, in the county of Ventura and State of California, have invented certain new and useful Improvements in Clutches; and I do declare the following to be a full, clear, and exact description of the invention, such as will enable others skilled in the art to which it appertains to make and use the same.

This invention relates to an improved clutch which is especially, although not necessarily, designed to be used in connection with a pulley which is loosely mounted on a driven shaft and is designed to be connected to the latter for rotation therewith by the improved clutch.

The principal object of the invention is to generally improve upon clutches of this type by the provision of one of extreme simplicity and durability which is practical, can be operated with ease and facility, and is such that the parts thereof can be easily and readily disconnected from one another for making repairs or for any other reason.

Other objects and advantages of the invention will be apparent during the course of the following description.

In the accompanying drawings forming a part of this specification and in which like numerals are employed to designate like parts throughout the same, Figure 1 is a central vertical sectional view through a device constructed in accordance with this invention showing the clutch in operative position.

Figure 2 is a view like Fig. 1 showing the clutch in inoperative position.

Figure 3 is a section taken substantially on the plane of the line 3—3 of Fig. 1.

Figures 4, 5 and 6 are detail perspective views of the parts of the device disassembled.

Referring to the drawings by numerals, 1 designates a driven shaft provided in its sides at diametrically opposite points with longitudinal keyways or grooves 2. At this point, I wish to direct attention to the fact that only one groove is actually necessary but two grooves are preferred. This applies to the other parts of the device equipped with keyways and keys. Proceeding, it is to be said that the numeral 3 designates a rotary element preferably in the form of a pulley, the same including a central hub portion 4 which in accordance with this invention is provided at one end with an enlarged portion 5 having a counter bore 6 formed therein and providing what may be termed a socket. This pulley is loosely mounted on the shaft 1 as shown but is designed under certain circumstances to rotate with the shaft. To this end, the inner face of the bore of the hub portion 4 is equipped with diametrically opposite longitudinally extending keyways or grooves 7 which are designed to be registered with the grooves in the shaft when the pulley is coupled to the latter. In addition to the parts mentioned, the device includes a guide sleeve 8 which is fixed on the shaft 1 by a pin $8^a$ as shown. This guide sleeve is equipped at one end with a flange 9 which extends into and is rotatable in the aforesaid counter bore 6. In order to connect the pulley and guide sleeve together, I make use of a retaining ring 10 which is bolted or otherwise secured to the enlarged hub portion 5 and retains the flange 9 in the counter bore 6. With this construction, it will be seen that the minimum amount of time will be required in assembling and dis-assembling the parts to make repairs or for any other desired reason. Here, I wish to point out that the guide sleeve 8 in addition to being provided with the flange 9, is equipped on its inner face with diametrically opposite grooves or keyways 11 which are designed to be alined with the aforesaid grooves. Diametrically opposite keys or ribs 12 of the clutch member 13 are slidable in the last named grooves 11, being of a width to extend into the grooves 7 and above the surface of the shaft 1 as shown. The clutch member 13 in addition to the keys includes a grooved ring-like head or collar 14, the grooves of this collar being designed, as is obvious, to receive the lateral lugs 15 of an operating fork 16 which is designed to slide the clutch member back and forth on the shaft. Here, it may be pointed out that that portion of the keys that extends into the grooves 2 serves, as is obvious, to limit the sliding movement of the clutch member in one direction.

In operation, it is understood that the shaft 1 is driven by any suitable means (not shown.) When the parts are in the position disclosed in Fig. 2, the pulley 3 runs idle. When it is desired to cause the pulley to rotate with the shaft, the operating fork 16 is moved inwardly, that is, toward the left, In so doing, a sliding movement is imparted to the clutch member 13 and the keys 12 are projected into the keyways 7 in the pulley hub. Since the clutch member rotates with the shaft, it will be seen that the pulley will be connected to the latter and rotated therewith.

While I have shown and described particular means for operating the clutch member, I desire it to be understood that any other suitable means may be employed. Furthermore, while I have shown and described the device as including pairs of keys and keyways, I desire it to be understood that it will operate with a single key and single keyway in the guide sleeve, hub, and shaft.

A careful consideration of the foregoing description taken in connection with the accompanying drawings will be found sufficient to enable persons skilled in the art to which the invention relates to obtain a clear understanding of the operation, and the construction and arrangement of the same. Therefore, a more lengthy and detailed description is deemed unnecessary.

In all probability, the best results may be obtained with the construction and arrangement herein shown and described. However, slight minor changes coming within the scope of the subjoined claims may be resorted to if desired.

I claim:

1. A device of the class described comprising a driven shaft having a longitudinal groove in one side, a pulley arranged on said shaft and including a central hub having a groove formed therein for registry with the first named groove, said hub being also formed at one end with an enlargement having a socket, a grooved guide sleeve mounted on said shaft adjacent the pulley, said sleeve having a lateral flange at its inner end extending into and rotatable in said socket, separate means for positively fixing the guide sleeve to the shaft, a retaining ring secured to the outer end of said enlargement and bearing against said flange to hold the latter in the socket, and a clutch member slidably mounted on said shaft and provided with a key slidably received in the grooves in said hub, shaft and sleeve.

2. In a device of the class described, a longitudinally grooved driven shaft, an axially grooved pulley, the grooves in said shaft and pulley being adapted to register, and means for connecting said pulley and shaft to rotate in unison; said means comprising a grooved guide sleeve mounted on said shaft adjacent the pulley, means for rotatably securing said sleeve to said pulley, means for positively fixing said sleeve to said shaft, and a clutch member slidably mounted on said shaft and provided with a key slidably received in the grooves in said pulley, shaft and sleeve.

In testimony whereof I have hereunto set my hand.

WILLIAM B. GROSS.